United States Patent [19]

Kobayashi

[11] Patent Number: 5,176,064
[45] Date of Patent: Jan. 5, 1993

[54] LIQUID PRESSURE BOOSTER

[75] Inventor: Michio Kobayashi, Saitama, Japan

[73] Assignee: Jidosha Kiki Co., Ltd., Tokyo, Japan

[21] Appl. No.: 815,409

[22] Filed: Dec. 31, 1991

[30] Foreign Application Priority Data

Jan. 31, 1991 [JP] Japan .................... 3-31709

[51] Int. Cl.$^5$ ............................. F15B 9/10
[52] U.S. Cl. ................... 91/376 R; 60/547.1; 60/593
[58] Field of Search ........... 91/369.1, 376 R, 370, 91/371, 372, 369.3, 373; 60/547.1, 548, 581, 585, 589, 593

[56] References Cited

U.S. PATENT DOCUMENTS

| | | | |
|---|---|---|---|
| 3,845,693 | 11/1974 | Meyers | 91/371 |
| 4,075,848 | 2/1978 | Ueda | 91/370 X |
| 4,203,631 | 5/1980 | Rivetti et al. | 60/548 X |
| 4,624,107 | 11/1986 | Horiuchi et al. | 60/547.1 |
| 4,656,923 | 4/1987 | Tsuyuki et al. | 91/369.1 |
| 4,706,546 | 11/1987 | Inoue et al. | 91/370 |
| 4,773,223 | 9/1988 | Mizusawa et al. | 91/376 R X |
| 4,967,560 | 11/1990 | Konishi | 60/645 |
| 5,010,732 | 4/1991 | Yagi | 60/413 |
| 5,076,141 | 12/1991 | Konishi | 91/369.1 X |

FOREIGN PATENT DOCUMENTS 55-44095  3/1980  Japan .
56-90765  7/1981  Japan .
2-60871   3/1990  Japan .
2-74456   3/1990  Japan .

Primary Examiner—Edward K. Look
Assistant Examiner—Hoang Nguyen
Attorney, Agent, or Firm—Flynn, Thiel, Boutell & Tanis

[57] ABSTRACT

An improvement of a liquid pressure booster provided with a reaction piston is disclosed. A guide formed on a housing (plug) is caused to project into a tubular section of a power piston. A reaction piston is slidably supported by the guide, and an input shaft is slidably supported by the reaction piston. A spring which urges the reaction piston is disposed in a clearance defined between the outer periphery of the guide and the inner periphery of the tubular section of the power piston. In this manner, the guide, a sliding portion of the reaction piston, a sliding portion of the input shaft and the spring can be disposed radially of each other while overlapping each other in the axial direction to minimize the axial size of the liquid pressure booster.

10 Claims, 2 Drawing Sheets

LIQUID PRESSURE BOOSTER

FIELD OF THE INVENTION

The invention relates to a liquid pressure booster as may be used in a brake booster or the like, and more particularly, to a liquid pressure booster which is provided with a reaction piston.

DESCRIPTION OF THE PRIOR ART

A liquid pressure booster is known in the art including a power piston slidably disposed in a housing and including a tubular section in its rear portion, a power chamber defined in the housing adjacent to the rear portion of the power piston, an input shaft slidably extending into the housing through the rear portion of the power piston, a control valve disposed between the tubular section of the power piston and the head of the input shaft for supplying a liquid pressure to the power chamber in accordance with an input load applied to the input shaft, a reaction piston slidably disposed around the input shaft and responsive to a liquid pressure within the power chamber to be retracted with respect to the input shaft for abutment against a stopper mounted on the input shaft, and a spring disposed between the power piston and the reaction piston for maintaining the reaction piston resiliently at an advanced position spaced from the stopper (see Japanese Laid-Open Patent Applications No. 60,871/1990 and No. 74,456/1990).

In these liquid pressure boosters as disclosed, an advancement of the input shaft causes the control valve to supply a liquid pressure to the power chamber in accordance with an input load applied to the input shaft, thereby driving the power piston forward for providing a servo action. The liquid pressure supplied to the power chamber acts upon the input shaft to provide a reaction thereto, and also acts upon the reaction piston to cause it to retract relative to the input shaft against the resilience of the spring.

The liquid pressure solely acts upon the input shaft having a relatively small pressure-responsive area to produce an increased output at a large servo ratio until the reaction piston abuts against the stopper mounted on the input shaft, whereupon the reaction piston and the input shaft move together, and the pressure-responsive area increases, so that the output load increases at a reduced servo ratio. The large servo ratio which prevails during the initial phase of operation assures a favorable feeling of operation.

Liquid pressure boosters provided with reaction pistons are also known in other different arrangements, as disclosed in Japanese Laid-Open Patent Applications No. 44,095/1980 and No. 90,675/1981.

In a conventional liquid pressure booster as mentioned above, it is necessary that the input shaft be formed with a portion which slides with respect to the housing and another portion which slides with respect to the reaction piston and that these portions are disposed in series, resulting in a disadvantage that the axial size becomes increased.

SUMMARY OF THE INVENTION

In view of the foregoing, it is a feature of the invention that the reaction piston is assembled into the liquid pressure booster in a sophisticated manner to minimize the axial size of the booster.

Thus, in a liquid pressure booster which is constructed in a manner mentioned above, in accordance with the invention, the housing is provided with a guide which projects into the tubular section of the power piston so that the reaction piston may be slidably fitted with the guide so as to be slidably supported thereby, and the input shaft is slidably fitted into an axial section of the reaction piston so that the input shaft may be slidably supported also by the reaction piston, with the spring disposed in a clearance defined between the outer periphery of the guide and the inner periphery of the tubular section of the power piston.

With this construction, the guide on the housing projects into the tubular section of the power piston to slidably support the reaction piston, which in turn slidably supports the input shaft, and the spring which urges the reaction piston is disposed in a clearance formed between the outer periphery of the guide and the inner periphery of the tubular section of the power piston. In this manner, the guide, the sliding portion of the reaction piston, the sliding portion of the input shaft and the spring are radially telescoped within each other while overlapping each other in the axial direction to minimize the axial size of the liquid pressure booster.

Above and other objects, features and advantages of the invention will become apparent from the following description of an embodiment thereof with reference to the attached drawings.

DETAILED DESCRIPTION OF EMBODIMENT

Figure 1:
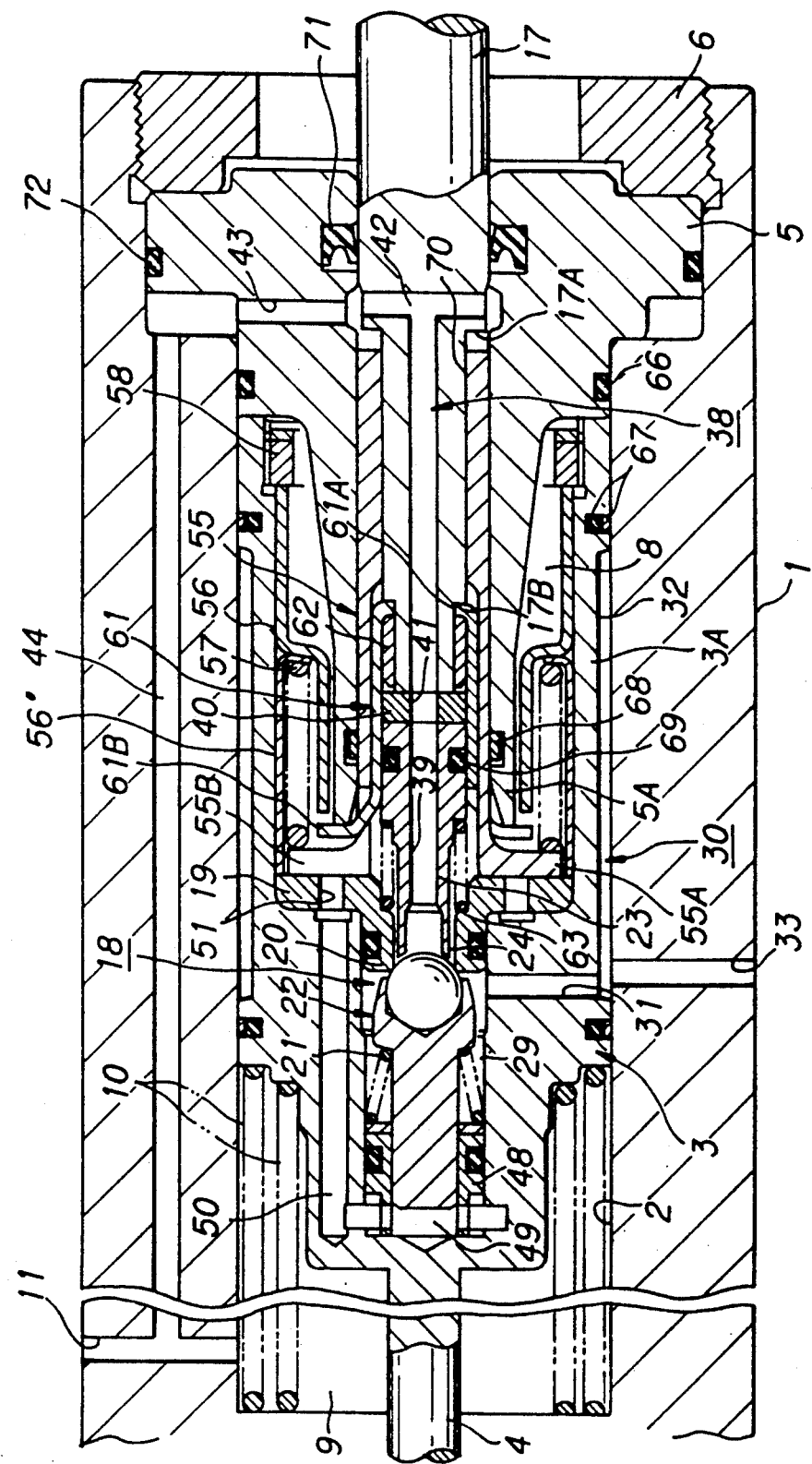
FIG. 1 is a cross section of one embodiment of the invention, as taken along the line I—I shown in FIG. 2.

Referring to the drawings, an embodiment of the invention will now be described. Referring to FIG. 1, a liquid pressure booster includes a housing 1 having a bore 2 formed therein, in which a power piston 3 is slidably fitted, the power piston including a tubular section 3A at its right-hand or rear portion. A push rod 4 which is formed at the left end of the power piston 3 slidably projects externally of the housing 1 in a liquid tight manner, with its head connected to the piston of a master cylinder, not shown.

At its right-hand end, the opening of the bore 2 is sealed by a plug 5, which forms part of the housing 1. The plug 5 is integrally secured to the housing 1 by a nut 6 which is threadably engaged with the housing 1. A power chamber 8 is formed between the plug 5 and the power piston 3 for admission of a pressure oil therein. A low pressure chamber 9 is formed on the opposite side of the power piston 3 from the power chamber 8 and receives a spring 10 therein. The resilience of the spring 10 normally maintains the power piston 3 at its inoperative position, shown, where it abuts against the plug 5. The chamber 9 communicates with a reservoir, not shown, through a passage 11 formed in the housing 1.

An input shaft 17, mechanically coupled to a brake pedal, not shown, slidably extends through the plug 5, and a control valve 18 is disposed between the left or head of the input shaft 17 and the inside of the tubular section 3A of the power piston 3.

The control valve 18 comprises a first valve seat 20 formed on a plate 19 disposed inside the tubular section 3A of the power piston 3, a ball valve 22 seated upon the first valve seat 20 in the opposite direction from the power chamber 8 under the resilience of a spring 21, an annular pin 23 formed on the head of the input shaft 17 for urging the ball valve 22 away from the first valve seat 20, and a second valve seat 24 formed on the head of the annular pin 23 and on which the ball valve 22 is adapted to be seated. The plate 19 is secured to the power piston 3 by means of retainers 56, 56' and a set screw 58 which is threadably engaged with the tubular section 3A of the power piston 3.

In the inoperative position shown, the ball valve 22 is seated upon the first valve seat 20 under the resilience of the spring 21, thus interrupting a communication between the power chamber 8 formed to the right of the first valve seat 20 and a pressure chamber 29 formed to the left of the first valve seat 20. The pressure chamber 29 communicates with a pump, not shown, through a supply passage 30, the pump acting to maintain a pressure oil of a given pressure in the pressure chamber 29. The supply passage 30 comprises a radial passage 31 formed in the power piston 3, an annular groove 32 formed around the outer peripheral surface of the power piston 3, a radial passage 33 formed in the housing 1 and a conduit, not shown, which connects the passage 33 and the pump together.

In the inoperative position shown, the second valve seat 24 formed on the head of the annular pin 23 is spaced from the ball valve 22 which is then seated upon the first valve seat 20, and under this condition, the power chamber 8 communicates with the reservoir through a discharge passage 38. The discharge passage 38 comprises a passage 39 formed in the axial portion of the annular pin 23, a passage 41 formed in the axial portion of a shim 40 interposed between the annular pin 23 and the input shaft 17, a passage 42 formed in the axial portion of the input shaft 17, a passage 43 formed in the plug 5, and a passage 44 formed in the housing 1, the latter passage 44 being connected to the passage 11 to allow a communication of the discharge passage 38 with the reservoir, not shown.

The left end of the ball valve 22 which constitutes the control valve slidably extends through a collar 48 in a liquid tight manner, defining a balance chamber 4a to the left of the collar 48. The balance chamber 49 communicates with the power chamber 8 through a communication path 50 formed in the power piston 3 and a through-opening 51 formed in the plate 19, whereby the pressure-responsive area of the ball valve 22 which faces the balance chamber 49 is made greater than the pressure-responsive area of the ball valve 22 which faces the power chamber 8, or the inner area within the first valve seat 20 from which the inner area of the second valve seat 24 is subtracted. By choosing the pressure-responsive areas in a manner mentioned above, as the input shaft 17 and the annular pin 23 are driven forward to move the ball valve 22 away from the first valve seat 20 to allow a pressure rise within the power chamber 8, the ball valve 22 which had been seated upon the second valve seat 24 on the annular pin 23 is prevented from being spaced from the second valve seat 24 to cause the occurrence of a liquid leakage.

The plug 5 which forms part of the housing 1 is provided with a tubular guide 5A which extends into the tubular section 3A of the power piston 3, and a reaction piston 55 is slidably fitted in the guide 5A to be supported thereby in a slidable manner. The input shaft 17 is slidably fitted into the axial portion of the reaction piston 55, whereby the input shaft 17 is slidably supported by the reaction piston 55 which is in turn supported by the guide 5A.

The left end of the reaction piston 55 is formed with a flange 55A which extends radially outward, and a spring 57 is disposed between the outer portion of the flange 55A and the retainer 56 which is located within the tubular section 3A of the power piston 3, thus normally maintaining the reaction piston 55 in its inoperative position shown where it abuts against the plate 19.

Under this condition, the reaction piston 55 is located at its advanced position with respect to the input shaft 17, and is spaced from a stepped stopper 17A formed on the input shaft 17, and as will be described later, when the force exerted by the oil pressure within the power chamber 8 and acting upon the reaction piston 55 becomes equal to or exceeds the set forth of the spring 57, the reaction piston 55 will retract with respect to the input shaft 17 to abut against the stopper 17A against the resilience of the spring 57.

As a result, while the force exerted by the oil pressure within the power chamber 8 and acting upon the reaction piston 55 has been reacted by the power piston 3 through the spring 57 and the retainer 56 before the reaction piston 55 abuts against the stopper 17A, the force will be transmitted to the input shaft 17 as a reaction force after the abutment of the reaction piston 55 against the stopper 17A, thereby allowing a servo ratio to be changed between before and after the abutment of the reaction piston 55 against the stopper 17A.

The spring 57 and the retainer 56 are disposed in a clearance defined between the outer periphery of the guide 5A and the inner periphery of the tubular section 3A of the power piston 3. Accordingly, in the inoperative position shown, it will be seen that the guide 5A, a portion of the reaction piston 55 which slides relative to the guide 5A, a portion of the input shaft 17 which slides relative to the reaction piston 55, and the spring 57 which urges the reaction piston 55 are located radially relative to each other while overlapping in the axial action. As a consequence, the axial size of the liquid pressure brake booster can be reduced as compared with the conventional arrangement in which the sliding portions of the reaction piston 55 and the input shaft 17 have been disposed in series in the axial direction.

A mechanism which reduces a loss stroke of the input shaft 17 during the initial phase of operation will be described. The head of the input shaft 17 is formed with a step 17B to provide a reduced diameter, and the head thereof which is located forward of the step 17B is inserted into a radially inner flange 61A which is formed on the right end of a tubular stop member 61, with the flange 61A abutting against the step 17B. An annular member 62 is disposed as a press fit into a clearance defined between the outer periphery of the input shaft 17 which is located forward of the step 17B and the inner periphery of the tubular stop member 61, thus maintaining a liquid tightness between the input shaft 17 and the tubular stop member 61 while securing the latter to the input shaft 17.

Figure 2:
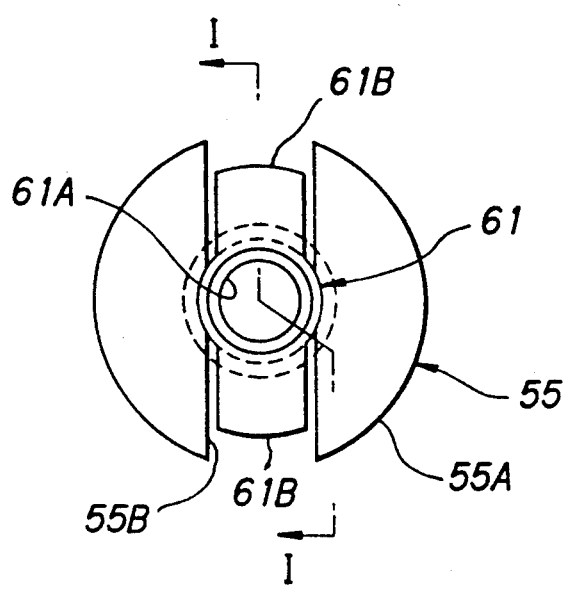
FIG. 2 is a front view of a reaction piston 55 and a cylindrical stop member 61, as assembled together, shown in FIG. 1.

As shown in FIG. 2, the left or head of the tubular member 61 is integrally formed with diametrically located, radially outwardly extending stoppers 61B. Each stopper 61B extends outward of the axial portion of the reaction piston 55 through a diametrically extending slits 55B formed in the flange 55A of the reaction piston 55.

The shim 40 and the annular pin 23 are sequentially inserted into the tubular stop member 61, and a spring 63 is disposed between the annular pin 23 and the plate 19, so that in the inoperative position shown, the stopper 61B is disposed in abutment against the left end face of the guide 5A to limit the retreating movement of the input shaft 17. On the other hand, the left end of the retainer 56 extends to a position adjacent to and located to the right of the stopper 61B, whereby during the retreating movement of the power piston 3, the retainer 56 is effective to limit the retreating movement of the input shaft 17.

A liquid tightness of a space located radially outward of the power chamber 8, which is defined within the bore 2, is maintained by a seal member 66 which is disposed around the outer periphery of the plug 5, and a seal member 67 which is disposed around the outer periphery of the power piston 3. On the other hand, a space located radially inward of the power chamber 8 is sealed against the discharge passage 38 by seal means disposed at four locations. Specifically, a seal member 68 disposed around the inner periphery of the guide 5A seals a clearance between the reaction piston 55 and the guide 5A and communicating with the power chamber 8; a seal member 69 disposed around the outer periphery of the annular pin 23 seals a clearance between the tubular stop member 61 and the annular pin 23 and communicating with the power chamber 8; and a combination of the annular member 62 and an axially relatively elongate sliding surface 70 between the reaction piston 55 and the input shaft 17 seals a clearance between the tubular stop member 61 and the reaction piston 55 and communicating with the power chamber 8.

Seal members 71, 72 disposed around the inner and the outer periphery of the plug 5 seal between the discharge passage 38 and the atmosphere.

The operation of the described arrangement will now be described. In the inoperative position shown when a brake pedal, not shown, is not depressed, the annular pin 23 is urged to the right by the spring 63 which is interposed between the pin 23 and the plate 19 and thus is spaced from the ball valve 22, whereby the power chamber 8 communicates with the reservoir through the discharge passage 38.

When the brake pedal is depressed to drive the input shaft 17 forward, the second valve seat 24 formed on the head of the annular pin 23 abuts against the ball valve 22 to interrupt the communication between the discharge passage 38 and the power chamber 8, and also the annular pin 23 causes the ball valve 22 to be moved away from the first valve seat 20 against the resilience of the spring 21 (see point A in FIG. 3), whereby the pressure oil which is normally introduced into the pressure chamber 29 is now admitted into the power chamber 8 through a clearance between the outer periphery of the annular pin 23 and the inner periphery of the plate 19.

When the pressure oil is introduced into the power chamber 8, the power piston 3 is driven forward or to the left against the resilience of the spring 10 while the reaction piston 55 is displaced to the right against the resilience of the spring 57. However, during the initial phase of such operation, the reaction piston 55 is maintained as spaced from the stopper 17A on the input shaft 17 by the spring 57.

Under this condition, the force exerted by the oil pressure within the power chamber 8 and acting upon the reaction piston 55 is reacted by the power piston 3 through the spring 57, retainer 56 and set screw 58, and thus is not transmitted to the input shaft 17. Accordingly, a reaction force which is transmitted to a driver through the input shaft 17 is obtained by the oil pressure within the power chamber 8 which directly acts upon the input shaft 17. Since the prevailing pressure-responsive area of the input shaft 17 is small, the output increases with a large servo ratio (see line B in FIG. 3).

Figure 3:
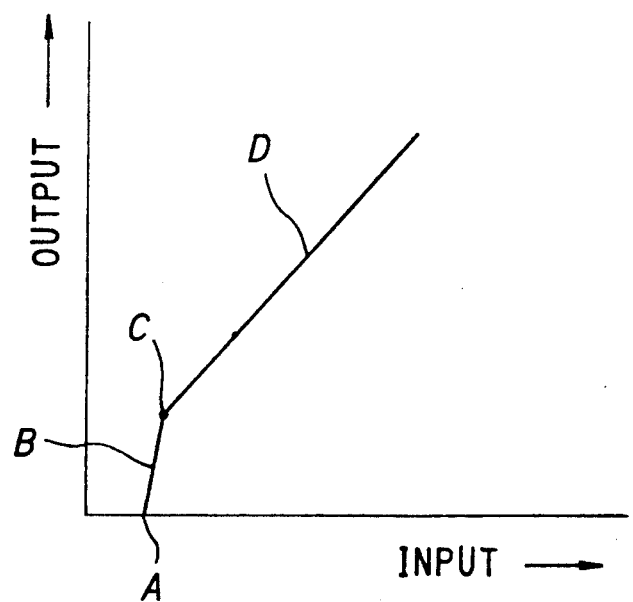
FIG. 3 graphically shows the characteristic diagram of the liquid pressure booster.

As the oil pressure within the power chamber 8 rises to continue to drive the power piston 3 to the left or forward, thus providing an effective braking action, the reaction piston 55 abuts against the stopper 17A on the input shaft 17 (see point C in FIG. 3), whereupon the force which acts upon the reaction piston 55 is transmitted through the stopper 17A to the input shaft 17 to reduce the servo ratio, and accordingly the output subsequently rises with a reduced servo ratio (see line D in FIG. 3).

A resistance presented upon the input shaft 17 by seal means when the brake pedal is depressed comprises resistances presented by the sliding surface 70 between the reaction piston 55 and the input shaft 17, and also by the seal member 71 disposed around the inner periphery of the plug 5. Since seal means which seal between the power chamber 8, which is subjected to an increased pressure, and the discharge passage 38 is formed by the sliding surface 70, the magnitude of the resistance presented upon the input shaft 17 by the seal means can be sufficiently reduced as compared with the resistance presented by a rubber seal member as used in the prior art, thereby providing a light feeling during the initial phase of depression of the brake pedal.

It will be recognized that during the reciprocating motion of the input shaft 17, the communication between the passage 42 formed in the input shaft 17 and the passage 43 formed in the plug 5 must be maintained, and accordingly the seal members 68 and 71 must be axially spaced by a distance in excess of the reciprocating stroke of the input shaft 17. On the other hand, the sliding surface 70 must be axially long enough to provide a satisfactory sealing action. In the present embodiment, the sliding surface 70 is formed in an interval as represented between the seal member 68 and 71 in the inoperative position shown, thus effectively preventing the axial size of the liquid pressure booster from being increased as a result of an increased axial length of the sliding surface 70.

When the brake pedal is now released and the annular pin 23 is displaced to the right under the influence of the spring 63, the ball valve 22 will be seated upon the first valve seat 20, thus interrupting the communication between the pressure chamber 29 and the power chamber 8. The second valve seat 24 on the annular pin 23 continues to move away from the ball valve 22, and the power chamber 8 communicates with the reservoir through the discharge passage 38, so that the oil pressure within the power chamber 8 decreases, causing the power piston 3 to retract to the right.

The resulting retreating movement of the input shaft 17 is limited by the abutment of the stopper 61B of the tubular stop member 61 which is integral with the input shaft against the retainer 56 which is integral with the power piston 3. Under this condition, the ball valve 22 which is seated upon the first valve seat 20 is largely spaced from the second valve seat 24 on the annular pin 23, securing a large enough channel area.

Immediately before the right end of the power piston 3 abuts against the plug 5, the stopper 61B of the tubular stop member 61 which is maintained in abutment against the retainer 56 abuts against the guide 5A. The power piston 3 retreats through a given stroke from this condition and comes to a stop as a result of the abutment of its right end against the plug 5, whereupon the stopper 61B of the tubular stop member 61 is located at an advanced position relative to the power piston by the given distance mentioned above, thus locating the second valve seat 24 on the annular pin 23 adjacent to the ball valve 22 which is seated upon the first valve seat 20.

Accordingly, when the brake pedal is depressed for the next time, the second valve seat 24 will be immediately seated upon the ball valve 22 to interrupt the communication between the power chamber 8 and the reservoir, thus reducing the loss motion during the initial phase of depression of the brake pedal.

It will be noted that the seal member 68 may be disposed around the outer periphery of the reaction piston 55 at its right end rather than around the inner periphery of the guide 5A. Alternatively, the seal member 68 may be omitted, and the sliding surface between the guide 5A and the reaction piston 55 may be utilized such as seal means.

While the invention has been described above in connection with an embodiment thereof, it should be understood that a number of changes, modifications and substitutions therein will readily occur therein to one skilled in the art from the above disclosure without departing from the spirit and scope of the invention defined by the appended claims.

What is claimed is:

1. A liquid pressure booster including a power piston slidably disposed in a housing and including a tubular section at its rear portion, a power chamber defined within the housing to the rear side of the power piston, an input shaft slidably extending into the housing through the rear portion of the power piston, said input shaft having a head, a control valve disposed between the tubular section of the power piston and the head of the input shaft for supplying a liquid pressure to the power chamber in accordance with an input load applied to the input shaft, a reaction piston slidably disposed around the input shaft and responsive to the liquid pressure within the power chamber to be retracted relative to the input shaft for abutment against a stopper mounted on the input shaft, said reaction piston having a forward end, and a spring disposed between the power piston and the reaction piston and exhibiting a given resilience to maintain the reaction piston at an advanced position spaced from the stopper;

characterized in that the housing is provided with a guide which projects into the tubular section of the power piston, the reaction piston being slidably fitted with the guide to be supported thereby in a slidable manner, the input shaft being slidably fitted into an axial portion of the reaction piston to be supported thereby in a slidable manner, the spring being disposed in a clearance defined between an outer periphery of the guide and an inner periphery of the tubular section of the power piston.

2. A liquid pressure booster according to claim 1 in which the guide comprises a plug which is integrally connected to the housing and forms part thereof.

3. A liquid pressure booster according to claim 1 in which the forward end of the reaction piston is formed with a flange which extends radially outward, a tubular retainer is fitted into the tubular section of the power piston, the spring being disposed between the flange of the reaction piston and the retainer.

4. A liquid pressure booster according to claim 1, further including a discharge passage formed in the axial portion of the input shaft and in the housing for allowing a communication between the power chamber and a reservoir through the control valve, high pressure seal means for sealing between the power chamber and the discharge passage, and low pressure seal means for sealing between the discharge passage and the atmosphere, the reaction piston being mechanically coupled for movement with the power piston, the low pressure seal means being disposed between the housing and the input shaft to seal between the discharge passage and the atmosphere, the high pressure seal means comprising first seal means disposed between the guide of the housing and the reaction piston, and second seal means being formed by sliding a surface between the reaction piston and the input shaft to seal between the power chamber and the discharge passage, the second seal means being formed by a sliding surface between the reaction piston and the input shaft.

5. A liquid pressure booster according to claim 4 in which the guide is formed by a plug which is integrally connected to and forms part of the housing.

6. A liquid pressure booster according to claim 4 in which the forward end of the reaction piston is formed with a flange which extends radially outward, a tubular retainer is fitted within the tubular section of the power piston, the spring being disposed between the flange of the reaction piston and the retainer.

7. A liquid pressure booster according to claim 1, further including a second stopper mounted on the input shaft for abutment against the guide of the housing to thereby limit a free retreating movement of the input shaft with respect to the power piston when the booster is in its inoperative condition, the reaction piston being slidably fitted with the guide of the housing while maintaining a liquid tightness therebetween, with one end of the reaction piston being disposed adjacent to the power chamber and its other end disposed on the lower pressure side, the reaction piston being formed with a slit adjacent to the power chamber, with the second stopper on the input shaft extending through the slit so as to be capable of abutting against the guide on the housing.

8. A liquid pressure booster according to claim 7 in which the guide comprises a plug which is integrally connected to the housing and forms part thereof.

9. A liquid pressure booster according to claim 7 in which the forward end of the reaction piston is formed with a flange which extends radially outward, a tubular retainer is fitted into the tubular section of the power piston, the spring being disposed between the flange of the reaction piston and the retainer.

10. A liquid pressure booster according to claim 7 in which the head of the input shaft is connected to a tubular stop member which forms part of the input shaft, said tubular stop member having a head, the head of the tubular stop member being formed with a projection which projects radially outward to serve as the second stopper.

* * * * *